US009241096B2

(12) United States Patent
Samuels et al.

(10) Patent No.: US 9,241,096 B2
(45) Date of Patent: Jan. 19, 2016

(54) HOUSING WITH TOUCH-THROUGH MEMBRANE

(71) Applicant: Woodman Labs, Inc., San Mateo, CA (US)

(72) Inventors: Rudy L. Samuels, Mill Valley, CA (US); Fabrice Barbier, San Carlos, CA (US); Evan L. Coons, San Mateo, CA (US); David C. Northway, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 118 days.

(21) Appl. No.: 13/652,362

(22) Filed: Oct. 15, 2012

(65) Prior Publication Data

US 2014/0104488 A1    Apr. 17, 2014

(51) Int. Cl.
*H04N 5/225*  (2006.01)
*G03B 17/56*  (2006.01)
*G03B 17/08*  (2006.01)

(52) U.S. Cl.
CPC .............. *H04N 5/2252* (2013.01); *G03B 17/08* (2013.01); *G03B 17/568* (2013.01)

(58) Field of Classification Search
CPC ..... H04N 5/2252; G03B 17/08; G03B 17/568
USPC ................ 348/81, 82, 333.01, 373, 375, 376; 312/223.1, 223.2; 361/679.01
See application file for complete search history.

(56) References Cited

U.S. PATENT DOCUMENTS

| 6,571,056 | B2 * | 5/2003 | Shimamura et al. ............ 396/27 |
| 6,646,864 | B2 * | 11/2003 | Richardson ................ 361/679.3 |
| 7,180,735 | B2 * | 2/2007 | Thomas et al. .......... 361/679.56 |
| 7,679,674 | B2 * | 3/2010 | Nishizawa ..................... 348/376 |
| 2005/0167304 | A1 * | 8/2005 | Shimamura ................ 206/316.2 |
| 2010/0060747 | A1 * | 3/2010 | Woodman .................. 348/222.1 |
| 2012/0262618 | A1 * | 10/2012 | Weakly .................... 348/333.01 |
| 2012/0314354 | A1 * | 12/2012 | Rayner ..................... 361/679.01 |

OTHER PUBLICATIONS

Purcell, K., "Optrix HD Sport Case Turns iPhone Into Extreme Sport Camera," GottaBe Mobile, Dec. 7, 2011, 5 Pages [online] [retrieved on Dec. 27, 2012] Retrieved from the internet <URL: http://www.gottabemobile.com/2011/12/07/optrix-hd-sport-case-turns-iphone-into-extreme-sport-camera/>.

* cited by examiner

*Primary Examiner* — Nhan T Tran
*Assistant Examiner* — Chriss Yoder, III
(74) *Attorney, Agent, or Firm* — Fenwick & West LLP

(57) ABSTRACT

A camera system includes a camera and a housing that is structured to at least partially enclose the camera. The camera includes a touch-sensitive surface that can be used to receive user input. The camera housing includes a touch-through membrane in a position that allows the membrane to align with the touch-sensitive surface when the camera is placed in the housing. The membrane transfers a user's gestures so that any touch gestures that are performed on the exterior surface of the membrane are transferred to the touch-sensitive surface.

20 Claims, 9 Drawing Sheets

HOUSING WITH TOUCH-THROUGH MEMBRANE

BACKGROUND

1. Technical Field

This disclosure relates to a housing for enclosing a camera, and more specifically, to an interface for interacting with a touchscreen of the enclosed camera.

2. Description of the Related Arts

Many users place their portable devices in housings, either to mount the device on a larger object, to allow for the underwater operation of the device, or merely to protect the device from accidental damage. In particular, some portable cameras come with housings that may be placed on a mount, harness, or strap to allow a user to capture photographs or video while keeping one or both hands free. These housings are especially useful while the user is performing fast-paced physical activities, such as surfing, bicycling, kayaking, or skydiving.

Although such housings can allow for hands-free operation of a camera, a user may occasionally use his hand to access features of the camera. For example, the user may wish to interact with a touchscreen on the camera to change a setting or to view previously-captured photographs or videos. One drawback to such housings is that they typically enclose the entire camera in a rigid shell, and it is not possible for a user to interact with a touchscreen on the camera when the camera is enclosed in the housing.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "FIGS.") 1A-1B illustrate a camera system with a housing door in an open position, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system includes a camera and a housing that is structured to enclose the camera. The camera includes a touch-sensitive surface (e.g., a touchscreen) that can be used to receive user input. The camera housing includes a touch-through membrane in a position that allows the membrane to substantially align with the touch-sensitive surface when the camera is placed in the housing. The membrane transfers a user's gestures so that any touch gestures that are performed on the exterior surface of the membrane are transferred to the touch-sensitive surface.

The camera housing may be divided into a first housing portion and a second housing portion that is moveably coupled to the first housing portion. The first housing portion is structured to receive the camera, and the second housing can be moved between an open and closed position. The camera is inserted into the first housing portion while the second housing portion is in the open position, and the second housing portion can then be moved into the closed position to enclose the camera in the housing. The touch-through membrane is mounted on the second housing portion so that the membrane substantially aligns with the touch-sensitive surface when the second housing portion is moved into the closed position.

In one embodiment, there is a compressible structure between the touch-through membrane and the camera housing. The compressible structure presses the membrane against the touch-sensitive surface so that the interior surface of the membrane is in physical contact with the touch-sensitive surface. This improves responsiveness when a user interacts with the touch-sensitive surface through the membrane. The compressible structure may also form a waterproof seal around the edges of the touch-through membrane, which prevents water damage to the camera when the camera is used to capture physical activities that take place near water, such as surfing or diving.

Camera System Configuration

Figure 1A:
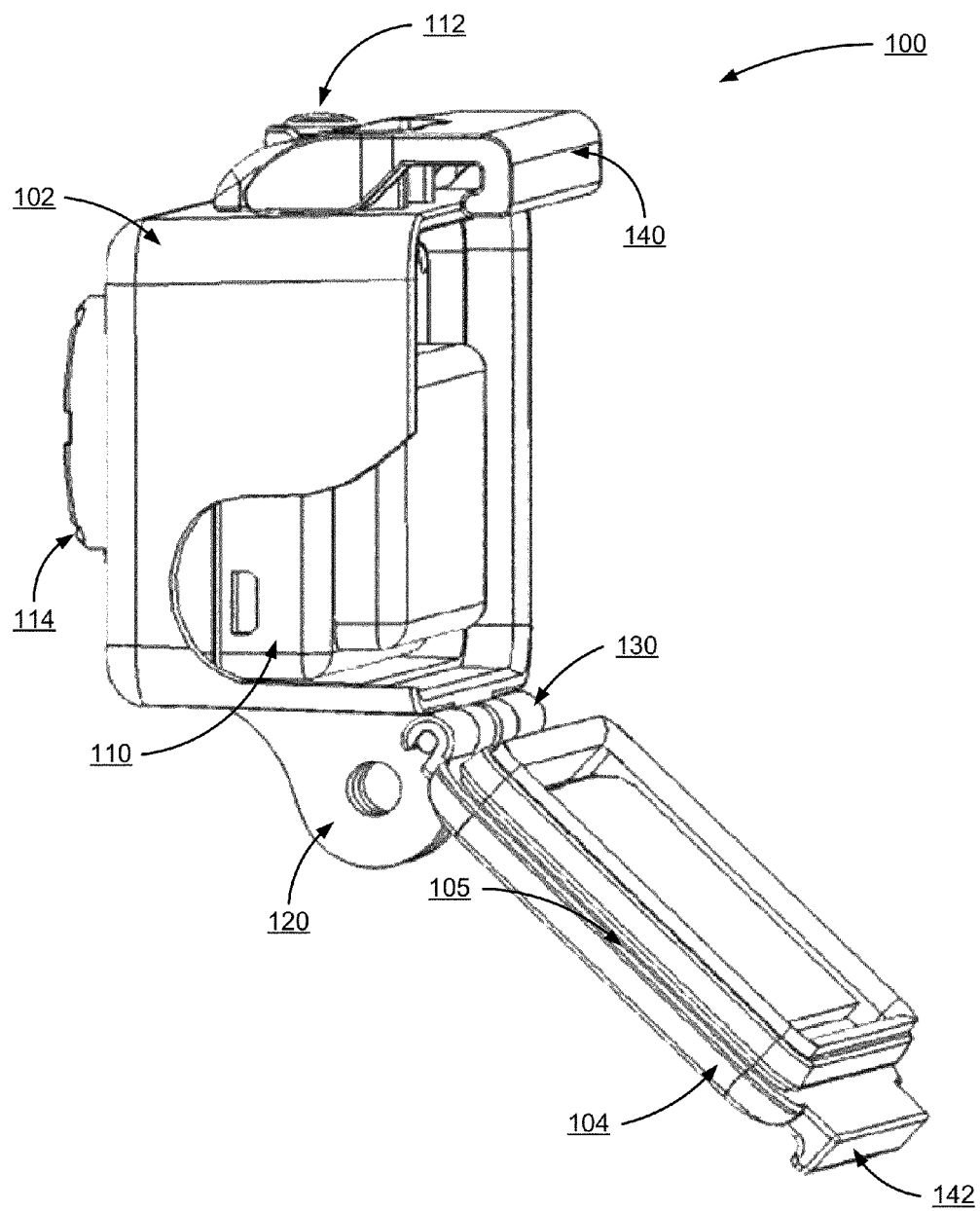
Figure 1B:
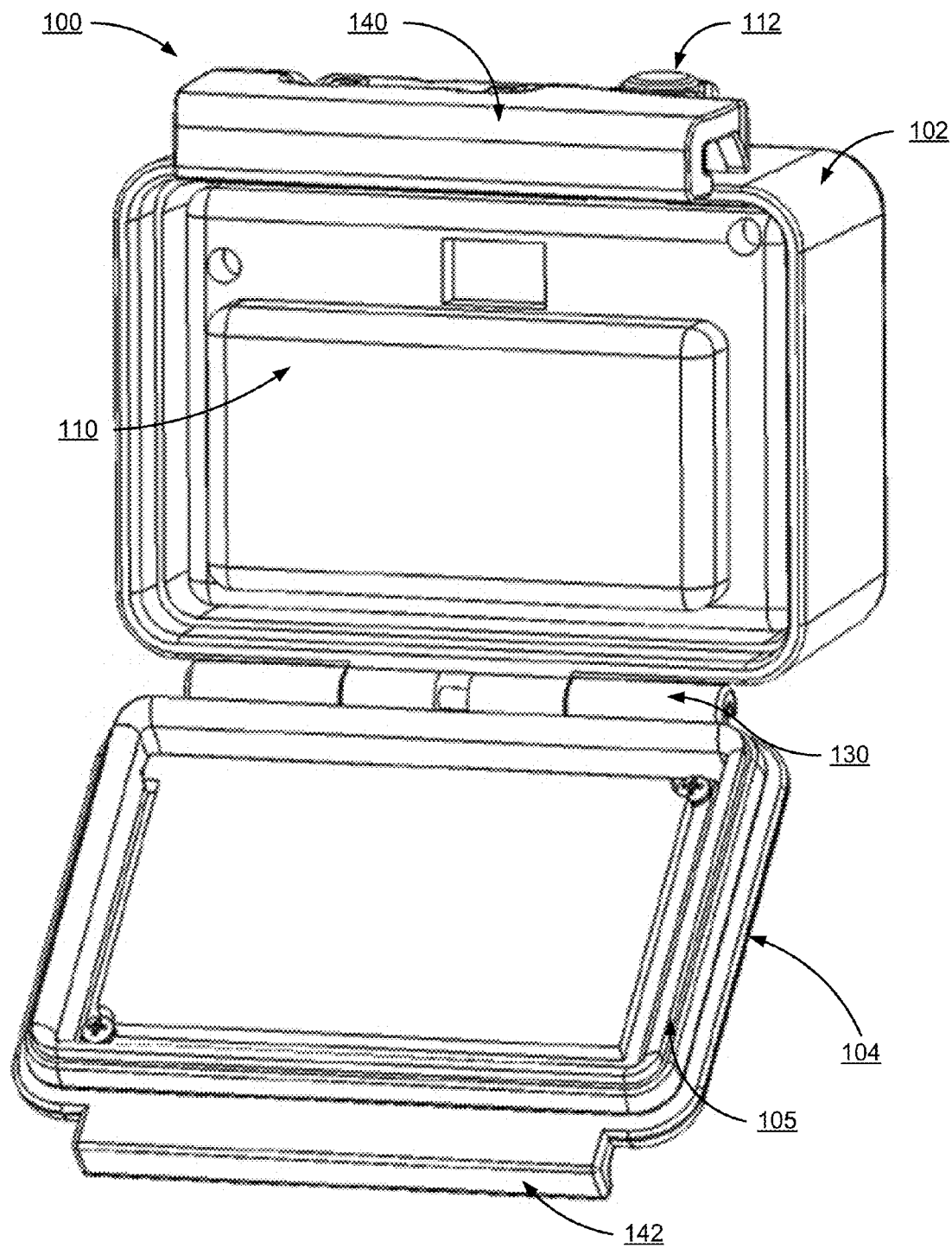

A camera system includes a camera and a camera housing for enclosing the camera. The camera can be configured as a still picture camera, a moving picture camera (e.g., video), or both, and may be selectable between different operational modes. FIGS. 1A-1B illustrate various views of the camera system in accordance with one embodiment. The camera system includes, among other components, a first housing portion 102 and a second housing portion 104 (i.e. door 104), collectively referred to herein as the housing 100. In one embodiment, the first housing portion 102 includes a front face with four sides (i.e. a top side, bottom side, left side, and right side) structured to form a cavity that receives a camera 110 (e.g. a still camera or video camera). A second housing portion 104 (or door 104) detachably couples with the first housing portion 102 opposite the front face of the first housing portion 102. The first housing portion 102 and second housing portion 104 are collectively structured to enclose the camera 110 within the cavity when the second housing portion 104 is secured to the first housing portion 102 in a closed position.

The camera housing 100 encloses and protects the camera 110. The camera housing 100 is particularly advantageous when using the camera 110 during periods of physical activity when the camera 110 may be susceptible to damage. For example, without the housing 100, the camera 110 may become scratched or otherwise damaged when used during physical activity. The camera 110 is removable from the housing 100 so that if the housing 100 becomes scratched or damaged, it can be easily replaced at a much lower cost than replacing the camera 110 itself.

In one embodiment, the camera 110 and camera housing 100 have a small form factor (e.g., a height of approximately 4 to 6 centimeters, a width of approximately 5 to 7 centimeters, and a depth of approximately 2 to 4 centimeters), and are lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects the camera 110 from water when used, for example, while surfing or scuba diving.

Portions of the camera housing 100 may include exposed areas to allow a user to manipulate buttons on the camera 110 that are associated with the camera functionality. Alternatively, such areas may be covered with a pliable material to allow the user to manipulate the input devices through the camera housing 100. For example, in one embodiment the top face of the camera housing 100 includes an outer shutter button 112 structured so that a shutter button of the camera 110 is substantially aligned with the outer shutter button when the camera 110 is secured within the camera housing 100. The shutter button of the camera 110 is operationally coupled to the outer shutter button 112 so that pressing the outer shutter button 112 allows the user to operate the camera shutter button. In one embodiment, the front face of the camera housing 100 includes a lens window 114 structured so that a lens of the camera 110 is substantially aligned with the lens windows 114 when the camera 110 is secured within the camera housing 100. The lens window 114 can be adapted for use with either a conventional lens of the camera 110, a wide angle lens, or any other specialized camera lens. In this embodiment, the lens window 114 comprises a waterproof seal so as to maintain the waterproof aspect of the housing 100.

In one embodiment, the camera housing 100 includes one or more securing structures 120 for securing the camera housing 100 to one of a variety of mounting devices. For example, in one embodiment the camera housing 100 can be secured to a wrist strap that secures the camera to a user's wrist. In another embodiment, the housing 100 couples to a helmet mount via the securing structure 120 for mounting the camera to a helmet. In yet another embodiment, a car mount for mounting the camera to a car couples to the securing structure 120. In yet other embodiments, other type of mount, strap, or securing devices known to those of ordinary skill in the art couple to the securing structure 120 for securing the camera to various other apparatuses or body parts.

Figure 2:
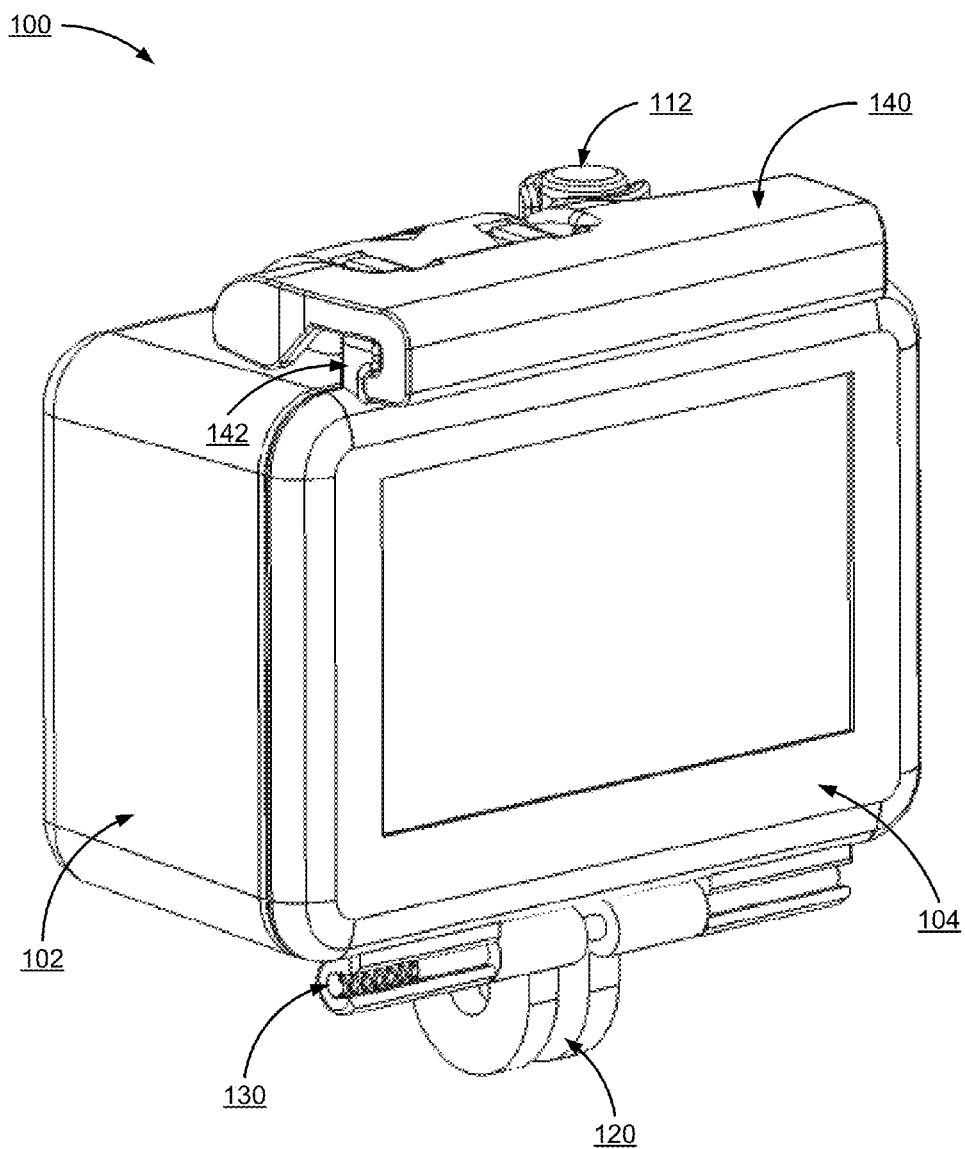
FIG. 2 illustrates a camera system with the housing door in a closed position, according to one embodiment.

In one embodiment, the second housing portion 104 comprises a door 104 (shown in the open position in FIGS. 1A-1B) that allows the camera 110 to be removed from the housing 100. The door 104 of the housing 100 pivots around a hinge 130 that allows the door 104 to be opened or shut. In one embodiment, a first fastening structure 140 located on the top face of the camera housing 100 detachably couples to a second fastening structure 142 on the door 104 of the housing 100. The fastening structures 140, 142 secure the door 104 to the first portion 102 of the camera housing 100 in a closed position when coupled. FIG. 2 illustrates the camera housing 100 with the door 104 secured in the shut position using the fastening structures 140, 142. For example, in one embodiment, the fastening structure 140 comprises a hook-shaped lateral bar and the fastening structure 142 comprises an L-shaped bar. The fastening structure 140 can pivot upwards to allow the door 104 to close and can then be pressed down around the fastening structure 142 to hold the door 104 in the closed position. In different embodiments, fastening structures for securing the door 104 can include, for example, a button assembly, a buckle assembly, a clip assembly, a hook and loop assembly, a magnet assembly, a ball and catch assembly, and an adhesive assembly, or any other type of securing mechanism.

In one embodiment, the housing 100 includes a watertight seal so that the housing 100 is waterproof when the door 104 is in the closed position. For example, in one embodiment, the door 104 includes a sealing structure 105 positioned on edges of the door 104. The sealing structure 105 provides a watertight seal between the first portion of the camera housing 102 and the door 104 when the first securing structure 140 on the top face of the camera housing 100 is coupled to the second securing structure 142 on the top edge of the door 104.

Figure 3:
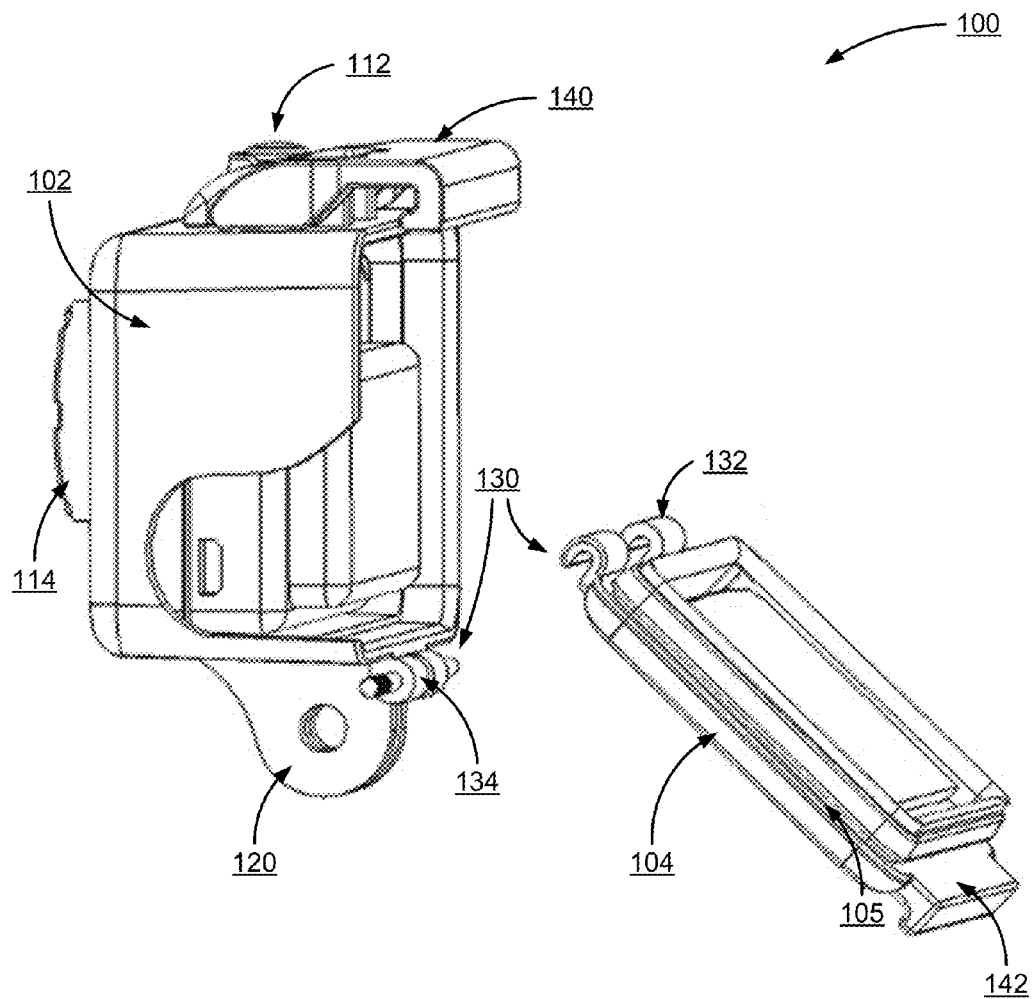
FIG. 3 illustrates a camera system with the housing door detached from the first housing portion, according to one embodiment.

In one embodiment, the door 104 detachably uncouples from the first housing portion 102 at the hinge 130. As used herein, the door 104 can be detachably uncoupled from the first housing portion 102 if the two components 102, 104 can be easily separated without causing structural damage or aberration to either component 102, 104. FIG. 3 illustrates an example embodiment of the camera housing 100 with the door 104 uncoupled from the first housing portion 102. In one embodiment, an outer hinge structure 132 on the bottom edge of the door 140 detachably couples to an inner hinge structure 134 on the bottom edge of the first housing portion 102 to form the hinge 130. For example, in the illustrated embodiment, the outer hinge structure 132 comprises one or more hook-shaped protrusions structured to securely fasten to a rod-shaped member of the inner hinge structure 134. In another embodiment, the rod-shaped member is part of the outer hinge structure 132, and the inner hinge structure 134 comprises one or more hook-shaped protrusions that can be fastened to the outer hinge structure 132. An example of this embodiment is shown in FIGS. 5A through 6B. Other mechanisms for detachably coupling the door 104 to the first housing portion 102 may also be used in various other embodiments. In still other embodiments, the door 104 may be permanently attached to the first housing portion 102. In other additional embodiments, the door 104 of the camera housing 100 can have different shapes or sizes to accommodate cameras 110 of different thicknesses and shapes.

Figure 4A:
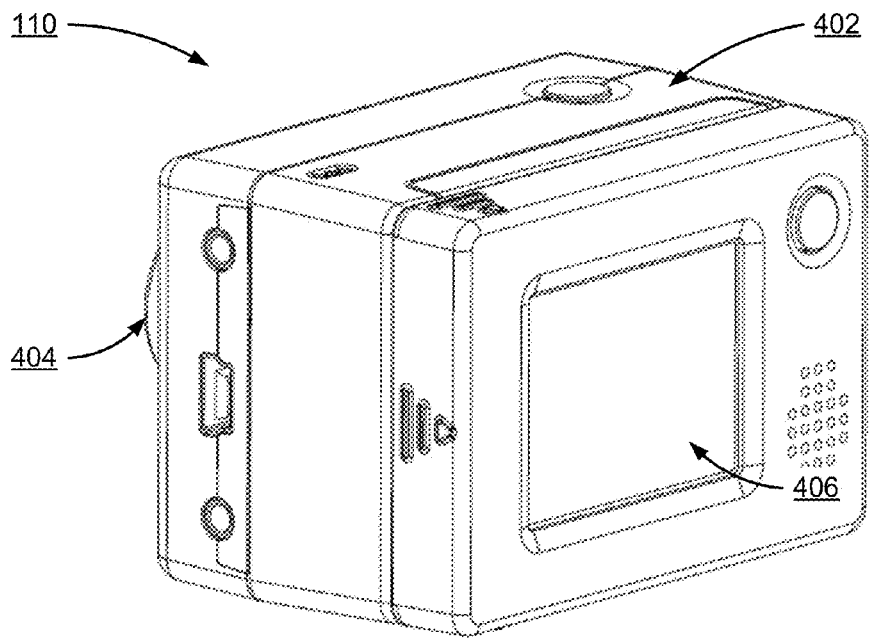
FIGS. 4A-4B illustrate a camera outside of the housing, according to one embodiment.
Figure 4B:
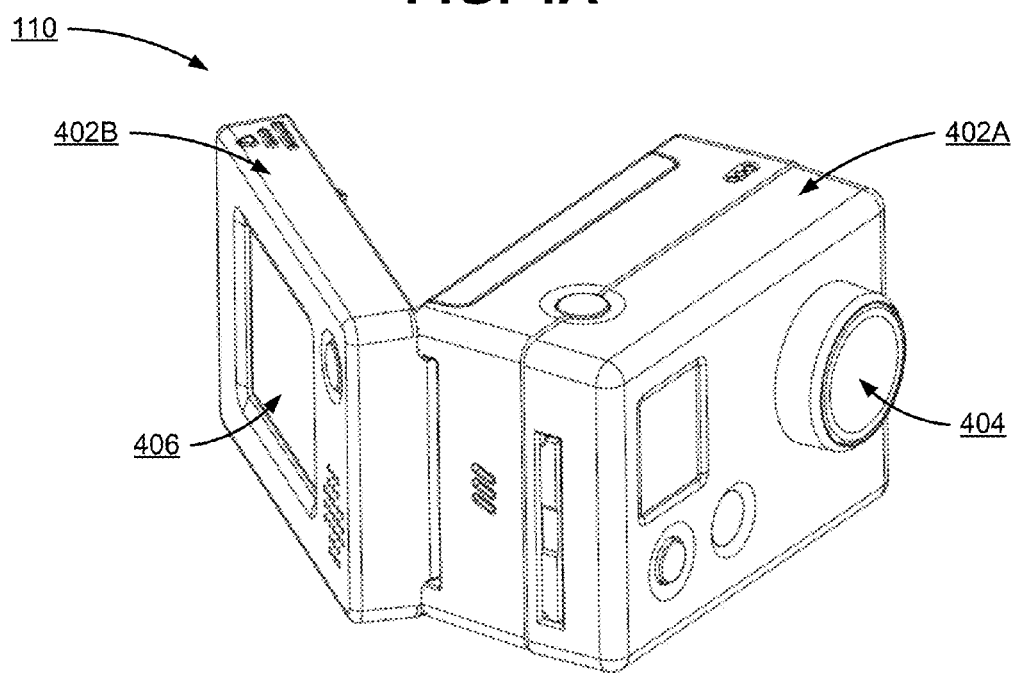

FIGS. 4A-4B illustrate a camera 110 outside of the housing 100, according to one embodiment. A camera body 402 forms the main structure of the camera 110. A camera lens 404 on an exterior surface of the camera body 402 focuses light onto a sensor inside the camera. Internally, the camera 110 contains imaging electronics (including the sensor) that capture image data and process the captured image data into photographs and videos.

The exterior of the camera body 402 also includes a touch-sensitive surface 406 that detects touch gestures and translates the touch gestures into input signals for imaging electronics and other electronic components of the camera 110. In the illustrated embodiment, the touch-sensitive surface 406 is a touchscreen that incorporates a display. The touchscreen 406 may be used to perform a variety of functions, such as viewing previously-captured and stored photographs and videos or changing various settings of the camera 110. In some embodiments, the touch-sensitive surface 406 includes a capacitive touch sensor that is capable of detecting multiple contact points simultaneously. Alternatively, the touch-sensitive surface 406 may include a resistive touch sensor or some other touch sensing technology.

In the illustrated embodiment, the camera body 402 is divided into a main body 402A and a detachable expansion body 402B. The main body 402A supports the camera lens 404 and the imaging electronics, and the touch-sensitive surface 406 is structured on a surface of expansion body 402B. The touch-sensitive surface 406 may alternatively be structured on a surface of the main body 402A, either on the same surface as the camera lens 404, on the opposite surface, or on one of the other surfaces of the main body 402A.

Touch-Through Membrane for Touchscreen Interaction

Figure 5A:
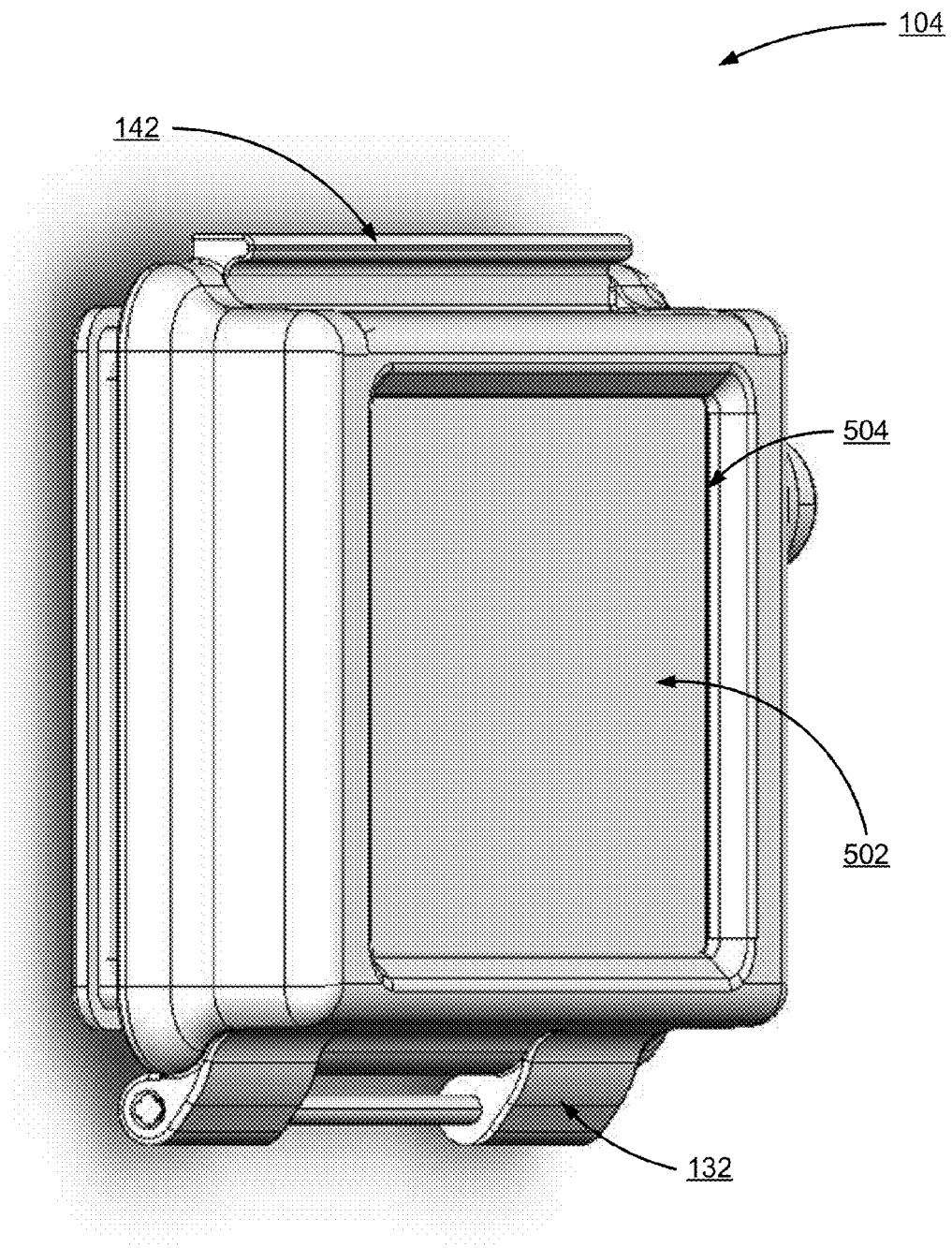
FIG. 5A is a perspective view of one embodiment of the housing door.

FIG. 5A is a perspective view of the door 104, according to one embodiment. As described above with FIGS. 2-3, the door 104 includes a fastening structure 142 on its top edge (adjacent to its top face) and an outer hinge structure 132 on its bottom edge (adjacent to its bottom face). In other embodiments, the fastening structure and outer hinge structure can be located on other edges. For example, the fastening structure may be located on the top edge while the outer hinge structure is located on the bottom edge opposite the top edge.

The housing door 104 also includes a touch-through membrane 502 that is positioned so that it substantially aligns with the touch-sensitive surface 406 of the camera 110 when the camera is inserted into the housing and the housing door 104 is in a closed position. In one embodiment, the membrane 502 is positioned on the rear face of the housing door 104 and substantially aligns with the touch-sensitive surface 406 on the rear face of the camera 110. As used herein, the touch-through membrane 502 is substantially aligned with the touch-sensitive surface 406 if a significant portion of the surface 406 (e.g., 80%, 90%, 95%, 98%, 100%, or some other percentage of the area of the surface 406) can be accessed through the membrane 502. As a whole, the membrane 502 allows a user to interact with the touch-sensitive surface 406 through the touch-through membrane 502 while the camera 110 is enclosed in the housing 100 and the door is in the closed position 104. The functionality of the membrane 502 is described in detail below with reference to FIG. 5B.

In some embodiments, a second sealing structure 504 is positioned between the touch-through membrane 502 and the housing door 104 to complement the sealing structure 105 at the edges of the housing door 104 that contact the first housing portion 102. In these embodiments, the second sealing structure 504 provides a watertight seal between the membrane 502 and the door 104, and the two sealing structures 105, 504 collectively seal the housing 100 to prevent water from entering the interior of the housing 100 and damaging the camera 110

Figure 5B:
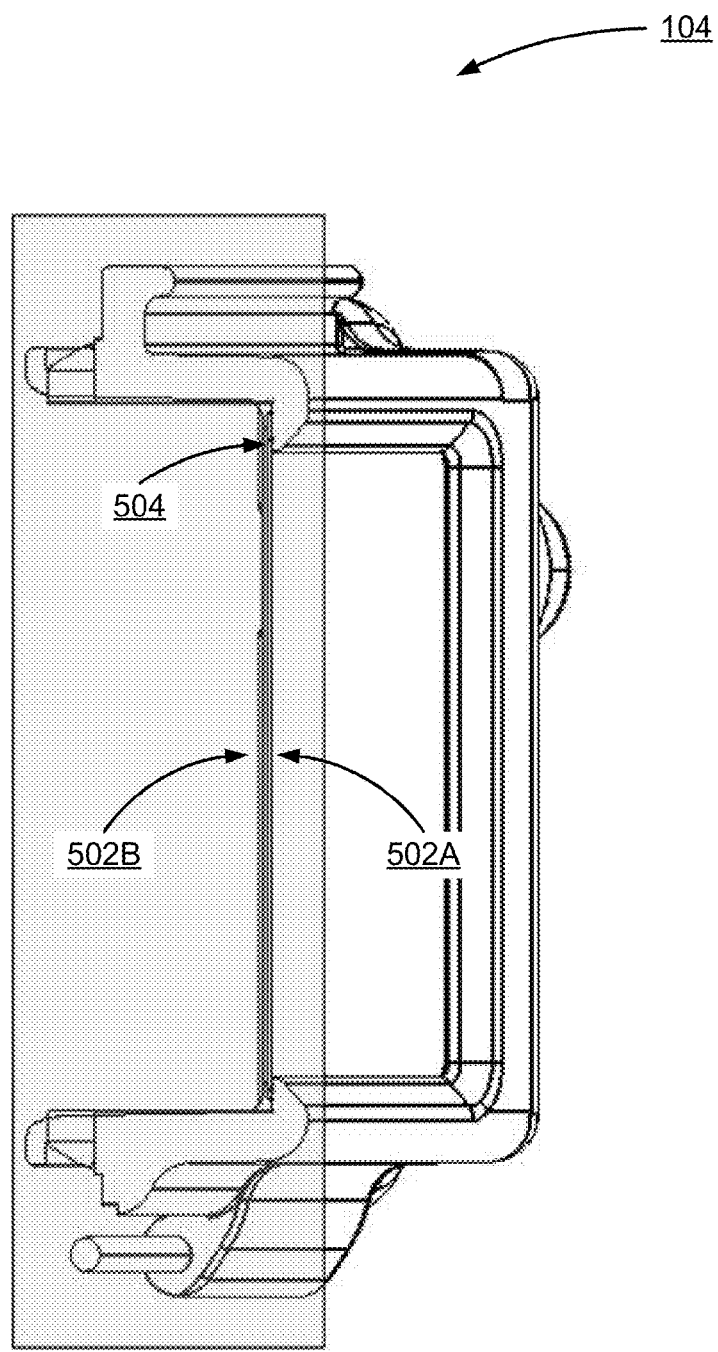
FIG. 5B is a cross sectional view of the housing door, according to the embodiment shown in FIG. 5A.

FIG. 5B is a cross-sectional view of the door 104, according to the embodiment of FIG. 5A. When a user performs touch interactions on the exterior side of the membrane 502A (e.g., by tapping or sliding one or more fingers on the exterior side 502A), the membrane 502 transfers the touch interactions to the touch-sensitive surface 406 via the interior side of the membrane 502B. In embodiments where the touch-sensitive surface 406 uses a capacitive touch sensor, the membrane 502 may be made of a conductive material that can transfer the conductivity of the user's finger from the exterior side 502A to the interior side 502B and onto the touch-sensitive surface 406. In embodiments where a resistive touch sensor is used, the membrane 502 may be a flexible material that transfers pressure applied to the exterior side 502A onto the touch-sensitive surface 406. In embodiments where a different touch sensing technology is used, the membrane 502 may have other properties that allow for the transfer of touch gestures from the exterior side 502A to the touch-sensitive surface 406.

As described above with reference to FIG. 3, the housing door 104 may be detachably coupled to the first housing portion 102 (e.g., with hook-shaped protrusions). This allows the housing door 104 to be replaced with a different housing door that does not include a touch-through membrane 502 or sealing structures 105, 504. The ability to replace the housing door 104 is beneficial in situations where the touch-through membrane 502 is not needed, either because access to the touch-sensitive surface 406 is not desired or because the camera 110 does not include a touch-sensitive surface 406 (e.g., if a detachable expansion body 502B without a touch-sensitive surface 406 is used, or if the detachable expansion body 502B is omitted altogether). In these situations, it may be advantageous to use a housing door with different features, such as a housing door with a completely rigid rear face that provides more robust protection than the membrane 502.

In the embodiment illustrated in FIGS. 5A-5B, the sealing structure 504 is used to adhere the touch-through membrane 502 directly to the door 104, which limits the movement of the membrane 502 relative to the door 104. As a result, there may be a gap between the touch-sensitive surface 406 and the interior side of membrane 502B when the camera 110 is enclosed in the housing 100 and the door 104 is in the closed position. If a gap is present, the membrane 502 stretches in order to fill the gap and contact the touch-sensitive surface 406 when the user performs a gesture on the exterior side 502A of the membrane. In the embodiment of FIG. 5A-5B, the size of the gap can vary due to dimensional tolerances and process variation when manufacturing the camera housing 100 and the camera body 402, and the presence of the gap can prevent the camera from remaining motionless inside the housing (e.g., the camera might rattle). A compressible structure can be added between the touch-through membrane 502 and the door 104 to reduce or eliminate the gap between the interior side of the membrane 502B and the touch-sensitive surface 406. An embodiment that includes a compressible structure in this position is described below with reference to FIGS. 6A-6B.

Figure 6A:
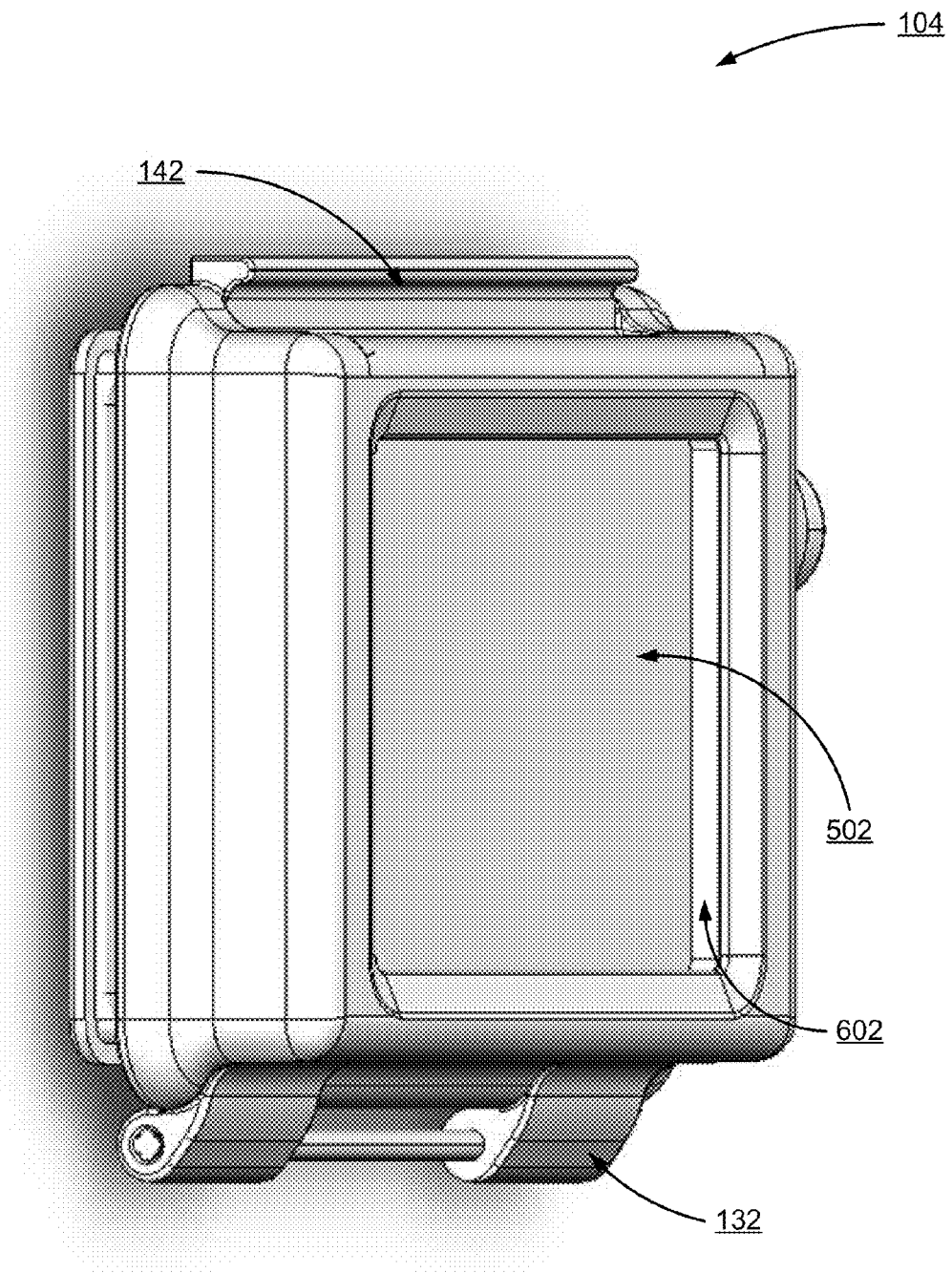
FIG. 6A is a perspective view of another embodiment of the door.

FIG. 6A is a perspective view of the door 104, according to another embodiment. Similar to the embodiment of FIGS. 5A-5B, the door 104 includes a touch-through membrane 502 that is positioned to substantially align with the touch-sensitive surface 406 of the camera 110 when the camera 110 is enclosed in the housing 100 and the door 104 is in the closed position. In this embodiment, the exterior side 502A of the membrane is adhered to a compressible structure 602, and the compressible structure 602 is adhered to the door 104. The compressible structure 602 performs several functions including securing the camera in the housing 100, enhancing the usability of the touch-sensitive surface 406, and protecting the camera 110 from water, as described below with reference to FIG. 6B.

Figure 6B:
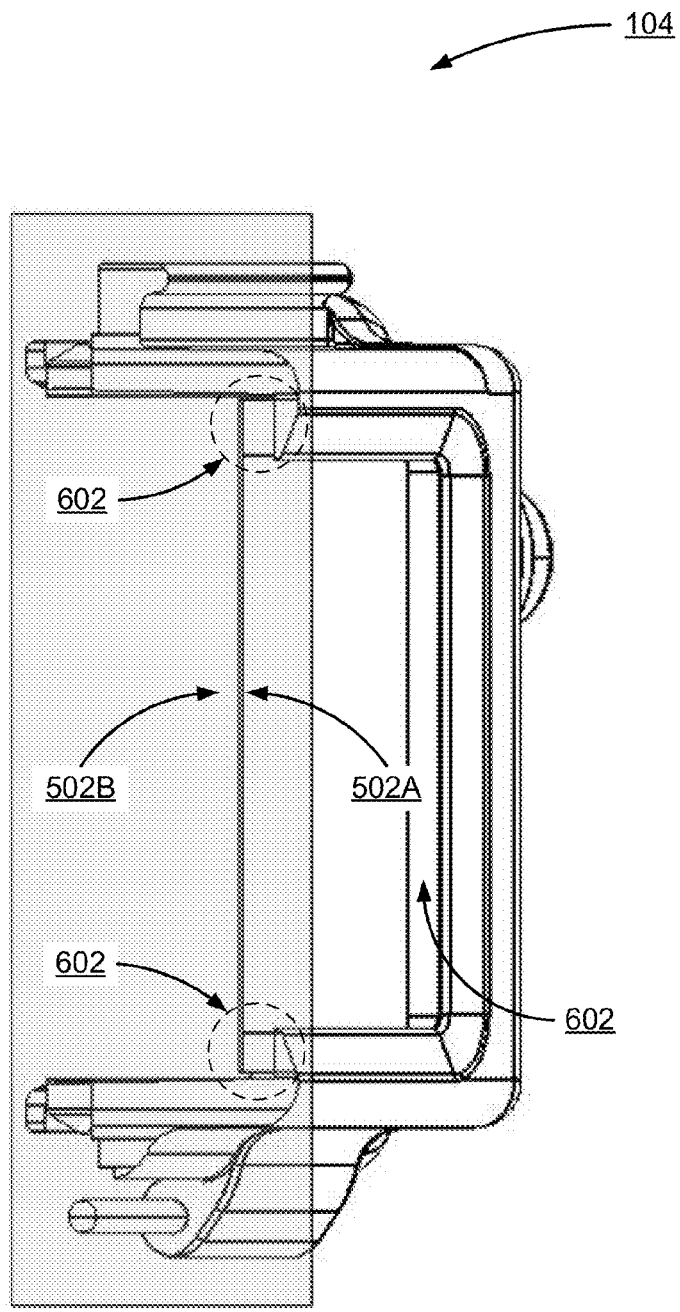
FIG. 6B is a cross sectional view of the door, according to the embodiment shown in FIG. 6A.

As shown in the cross-sectional view of FIG. 6B, the compressible structure 602 has a rectangular cross section and a substantially rectangular shape that follows the edge of the touch-through membrane 502. The outer border of the touch-through membrane 502 is adhered to one surface of the compressible structure 602, and the opposite surface of the structure 602 is adhered to the door 104. The compressible structure 602 may have a different cross section or shape in embodiments where the housing 100 or camera 110 have a different shape or size than the housing 110 and camera 110 illustrated in the accompanying drawings.

As described above with reference to FIGS. 1A-1B, the first housing portion 102 can be structured to form a cavity that receives the camera 110, and the camera 110 can be enclosed in the housing 100 by opening the door 104, placing the camera 110 in the first housing portion 102 and moving the door 104 to the closed position. As the door 104 is moved into the closed position, the compressible structure 602 presses against the back of the camera 110 and pushes the front of the camera 110 against the front of the first housing portion 102. Since the compressible structure 602 can be compressed to a variety of thicknesses, the structure 602 can compensate for variations in the thickness of the camera 110 that may arise due to manufacturing tolerances. Thus, the structure 602 can compress to a larger thickness when the camera 110 is slightly thinner, and the structure 602 can compress to a smaller thickness when the camera 110 is slightly thicker. As a result, the compressible structure 602 holds the camera 110 securely against the first housing portion 102 regardless of any variations in the camera's thickness and prevents the camera 110 from rattling or making any other undesired movement.

Since the touch-through membrane 502 is adhered to the compressible structure 602, the structure 602 also presses the interior side 502B of the membrane toward the touch-sensitive surface 406 of the camera 110 when the camera 110 is inside the housing 100 with the housing door 104 in the closed position and when the compressible structure 602 is compressed.

In some embodiments, nothing is attached to the interior side 502B of the membrane, and the compressible structure 602 holds the membrane 502 in physical contact with the touch-sensitive surface 406. Thus, there is no need for the membrane 502 to stretch in order to fill a gap between its interior side 502B and the touch-sensitive surface 406. In these embodiments, the physical contact between the touch-sensitive surface 406 and the membrane 502 beneficially increases the responsiveness of the touch-sensitive surface 406 when operated through the membrane 502 and reduces the amount of tension that is applied to the membrane 502 during normal use.

In other embodiments, a spacer (not shown in FIGS. 6A-6B) is positioned on the interior side 502B of the membrane. As a result, the spacer contacts with the camera 110 and holds the interior side 502B of the membrane substantially close to the touch-sensitive surface 406 when the door 104 is in the closed position. As used herein, the interior side 502B is substantially close to the touch-sensitive surface 406 when there is a small gap separating the two components 406, 502B (e.g., 0.3 mm, 0.5 mm, 0.7 mm, 1 mm, etc.). In these embodiments, the compressible structure 602 holds the camera 110 in place by pressing the spacer against the back of the camera 110, which in turn pushes the front of the camera 110 against the front of the first housing portion 102. Having a small gap between the membrane 502 and the touch-sensitive surface can prevent moisture from becoming trapped under the membrane 502 (e.g., in small bubbles pressed against the touch-sensitive surface 406). Meanwhile, using the spacer to establish the small gap and also push the camera 110 forward adds security by preventing the camera 110 from making any unwanted movements within the housing 100.

The compressible structure 602 can be made of any material that substantially changes shape when pressure is applied. In some embodiments, the compressible structure 602 is made of a waterproof material (e.g., rubber or waterproof foam) that forms a watertight seal between the touch-through membrane 502 and the door 104. Using a waterproof material protects the camera 110 from water damage when the housing 100 is subjected to splashing or submerged in water, which beneficially allows a user to interact with the touch-sensitive surface 406 while capturing photographs or video of water-related physical activities such as surfing or diving. In embodiments where the housing 100 is not expected to be used around water, the compressible structure 602 may be made of a non-waterproof material (e.g., porous foam) to reduce manufacturing costs.

In an alternative embodiment, the touch-sensitive surface 406 is structured into the housing 100 (e.g., the housing door 104) instead of the camera 110. In this embodiment, the touch-sensitive surface 406 may be aligned with a membrane 502 in a manner similar to the embodiments described above. Alternatively, the touch-sensitive surface 406 may be integrated into the exterior surface of the housing 100 in a manner that prevents water from damaging the touch sensing electronics that convert touch gestures into input signals for the camera 110. The input signals may be transmitted to the camera 110 wirelessly, over a cable coupling to the camera 110, or over some other type of electronic coupling.

Although the housing 100 illustrated in the accompanying drawings is configured for use with a camera 110, the principles described herein may be adapted to any electronic device with a touch-sensitive surface. For example, the housing 100 and touch-through membrane 502 may be adapted for use with touch-sensitive surfaces on cell phones, music players, PDAs, GPS units, tablet computers, laptop computers, or other electronic devices. In addition, the housing 100 may be embodied as a single portion instead of the two housing portions 102, 104 illustrated in the accompanying drawings. For example, the housing 100 may be a single rigid enclosure with an opening that allows for the insertion and removal of an electronic device. Furthermore, the touch-through membrane 502 may be placed at any position on the housing 100 that allows the membrane 502 to substantially align with a touch-sensitive surface of the enclosed electronic device. For example, the membrane may alternatively be placed on the front, sides, top, or bottom of the housing 100 to substantially align with a corresponding touch-sensitive surface.

In some embodiments, the housing 100 may also be adapted for use with devices that have a touch-sensitive surface that does not incorporate a display, such as a trackpad or touchpad. For example, the housing 100 may be adapted for use with a laptop computer or a standalone touchpad peripheral that connects to a computer. In other embodiments, the housing 100 may be used with a device that features a touch-sensitive surface with multiple regions. For example, the device may be a personal digital assistant (PDA) with a first touch-sensitive region that incorporates a display (e.g., a touchscreen for displaying a user interface) and a second touch-sensitive region that does not incorporate a display (e.g., a trackpad for handwriting recognition). In these embodiments, the touch-through membrane may overlap with the entire touch-sensitive surface or only some regions of the touch-sensitive surface.

Additional Configuration Considerations

It is noted that some embodiments described herein have used the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a housing with a touch-through membrane as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera system, comprising:
  a camera comprising:
    a camera body having a camera lens structured on a first surface of the camera body;
    imaging electronics internal to the camera body, the imaging electronics for capturing images via the camera lens; and
    a touch-sensitive surface structured on a second surface of the camera body opposite the first surface, the touch-sensitive surface for receiving user input to the camera; and
  a camera housing comprising:
    a first housing portion structured to receive the camera;
    a second housing portion configured to be moved between an open position and a closed position relative to the first housing portion, wherein the camera housing encloses the camera when the second housing portion is in the closed position, the second housing portion having an external surface and an internal surface;
    an inner hinge structure located on a bottom edge adjacent to a bottom face of the first housing portion;
    an outer hinge structure located on a bottom edge adjacent to a bottom face of the second housing portion, the outer hinge structure detachably coupling to the inner hinge structure, wherein the outer hinge structure and the inner hinge structure form a hinge when coupled so that the second housing portion and the first housing portion are pivotally attached about the hinge;
    a first fastening structure located on a top face of the first housing portion, the top face opposite to the bottom face of the first housing portion;
    a second fastening structure located on a top edge adjacent to a top face of the second housing portion, the top face opposite to the bottom face of the second housing portion, the second fastening structure for detachably coupling to the first fastening structure so that the second housing portion is secured to the first housing portion in the closed position when the first fastening structure is coupled to the second fastening structure;
    a membrane positioned to substantially align with the touch-sensitive surface when the second housing portion is in the closed position, and configured to transfer touch interactions from an external side of the membrane to the touch-sensitive surface, the membrane comprising an external surface and an internal surface;
    a compressible structure adhered between the internal surface of the second housing portion and the external surface of the membrane such that the compressible structure does not make contact with the external surface of the second housing portion, the camera configured to exert a compressive force on the compressible structure when the camera is securely enclosed within the camera housing, and the compressible structure, in response to the compressive force, configured to exert a reciprocal force on the membrane, forcibly pressing the membrane onto the touch sensitive surface; and
    a spacer positioned on the internal surface of the membrane, wherein the compressible structure presses the spacer against camera body.

2. The camera system of claim 1, wherein the compressible structure forms a waterproof seal between the membrane and the second housing portion.

3. The camera system of claim 1, further comprising:
  a sealing structure positioned on edges of the second housing portion and configured to provide a watertight seal between the first housing portion and the second housing portion; and
  wherein the sealing structure and the compressible structure collectively cause the camera housing to become watertight when the second housing portion is moved into the closed position.

4. The camera system of claim 1, wherein the inner hinge structure comprises one or more hook-shaped protrusions configured to be detachably fastened to a rod-shaped member of the outer hinge structure.

5. The camera system of claim 1, further comprising a lens window, the lens window structured on the front face of the first housing portion to substantially align with the camera lens on the camera body.

6. The camera system of claim 1, wherein the compressible structure comprises a rectangular cross-section such that a first surface of the compressible structure fully abuts the internal surface of the second housing portion and such that a second surface of the compressible structure opposite the first surface fully abuts the external surface of the membrane.

7. A system, comprising:
an electronic device having a touch-sensitive surface for receiving user input; and a housing for the electronic device, comprising:
- an enclosure structured to enclose the electronic device, the enclosure comprising an external surface and an internal surface;
- a membrane having an external surface and an internal surface, the membrane configured to transfer touch interactions from the external surface of the membrane to the touch-sensitive surface of the electronic device;
- a compressible structure adhered between the internal surface of the enclosure and the external surface of the membrane such that the compressible structure does not make contact with the external surface of the enclosure, the electronic device configured to exert a compressive force on the compressible structure when the electronic device is securely enclosed within the enclosure, and the compressible structure, in response to the compressive force, configured to exert a reciprocal force on the membrane, forcibly pressing the membrane onto the touch sensitive surface; and
- a second compressible structure positioned on the internal surface of the membrane, wherein the compressible structure presses the second compressible structure against a surface of the electronic device.

8. The system of claim 7, wherein the compressible structure forms a waterproof seal between the membrane and the second housing portion.

9. The system of claim 7, wherein the compressible structure is further configured to press the electronic device against a surface of the enclosure to prevent the electronic device from making unwanted movements within the enclosure.

10. The system of claim 7, wherein the housing is waterproof.

11. The system of claim 7, wherein the enclosure comprises
- a first enclosure portion structured to receive the electronic device; and
- a second enclosure portion coupled to the first enclosure portion and configured to be moved between an open position and a closed position relative to the first enclosure portion, the enclosure enclosing the electronic device when the second enclosure portion is in the closed position, wherein the compressible structure is positioned between the external surface of the membrane and an internal surface of the second enclosure portion.

12. The system of claim 11, wherein moving the second enclosure portion into the closed position brings the internal surface of the membrane into contact with the touch-sensitive surface.

13. The system of claim 7, wherein the compressible structure comprises a rectangular cross-section such that a first surface of the compressible structure fully abuts the internal surface of the enclosure and such that a second surface of the compressible structure opposite the first surface fully abuts the external surface of the membrane.

14. A housing for an electronic device, comprising:
- an enclosure structured to enclose the electronic device, the electronic device having a touch-sensitive surface, the enclosure comprising an interior surface and an exterior surface;
- a membrane having an external surface and an internal surface, the membrane configured to transfer touch interactions from the external surface of the membrane to the touch-sensitive surface of the electronic device;
- a compressible structure adhered between the interior surface of the enclosure and the external surface of the membrane such that the compressible structure does not make contact with the exterior surface of the enclosure, the electronic device configured to exert a compressive force on the compressible structure when the electronic device is securely enclosed within the enclosure, and the compressible structure, in response to the compressive force, configured to exert a reciprocal force on the membrane, forcibly pressing the membrane onto the touch sensitive surface; and
- a second compressible structure positioned on the internal surface of the membrane, wherein the compressible structure presses the second compressible structure against a surface of the electronic device.

15. The housing of claim 14, wherein the compressible structure forms a waterproof seal between the membrane and the second housing portion.

16. The housing of claim 14, wherein the compressible structure is further configured to press the electronic device against the interior surface of the enclosure to prevent the electronic device from making unwanted movements within the enclosure.

17. The housing of claim 14, wherein the housing is waterproof.

18. The housing of claim 14, wherein the enclosure comprises
- a first enclosure portion structured to receive the electronic device; and
- a second enclosure portion coupled to the first enclosure portion and configured to be moved between an open position and a closed position relative to the first enclosure portion, the enclosure enclosing the electronic device when the second enclosure portion is in the closed position,
- wherein the compressible structure is positioned between the external surface of the membrane and an interior surface of the second enclosure portion.

19. The housing of claim 18, wherein moving the second enclosure portion into the closed position brings the internal surface of the membrane into contact with the touch-sensitive surface.

20. The housing of claim 14, wherein the compressible structure comprises a rectangular cross-section such that a first surface of the compressible structure fully abuts the interior surface of the enclosure and such that a second surface of the compressible structure opposite the first surface fully abuts the external surface of the membrane.

* * * * *